United States Patent [19]

Schilling et al.

[11] 4,210,269
[45] Jul. 1, 1980

[54] METHOD FOR DIFFUSION BONDING SHEET CLADDINGS TO SUPERALLOY SUBSTRATES

[75] Inventors: William F. Schilling, Niskayuna; Adrian M. Beltran, Ballston Spa, both of N.Y.

[73] Assignee: General Electric Company, Schenectady, N.Y.

[21] Appl. No.: 913,842

[22] Filed: Jun. 8, 1978

[51] Int. Cl.² ............................................. B23K 19/00
[52] U.S. Cl. .................................. 228/193; 29/156.8 B
[58] Field of Search ............... 228/106, 193, 186, 221, 228/233, 234, 236, 237; 29/156.8 R, 156.8 B

[56] References Cited

U.S. PATENT DOCUMENTS

| | | | |
|---|---|---|---|
| 3,145,466 | 8/1964 | Federska et al. | 228/221 X |
| 3,904,101 | 9/1975 | Beltran et al. | 29/156.8 B |
| 3,952,939 | 4/1976 | Schilling et al. | 228/193 |
| 4,043,498 | 8/1977 | Conn, Jr. | 29/156.8 B |
| 4,096,615 | 1/1978 | Cross | 228/193 X |
| 4,117,970 | 10/1978 | Hamilton et al. | 228/193 X |
| 4,137,619 | 2/1979 | Beltran et al. | 29/156.8 B X |

*Primary Examiner*—Leon Gilden
*Attorney, Agent, or Firm*—Jerome C. Squillaro

[57] ABSTRACT

Sheet cladding is applied to a substrate by applying powdered glass to the seams of the cladding after it has been assembled to the substrate. A vacuum at which the glass can be melted without decomposition is established and the glass is melted in the presence of preselected gas. Thereafter, the sheet cladding and the substrate are diffusion bonded.

7 Claims, 1 Drawing Figure

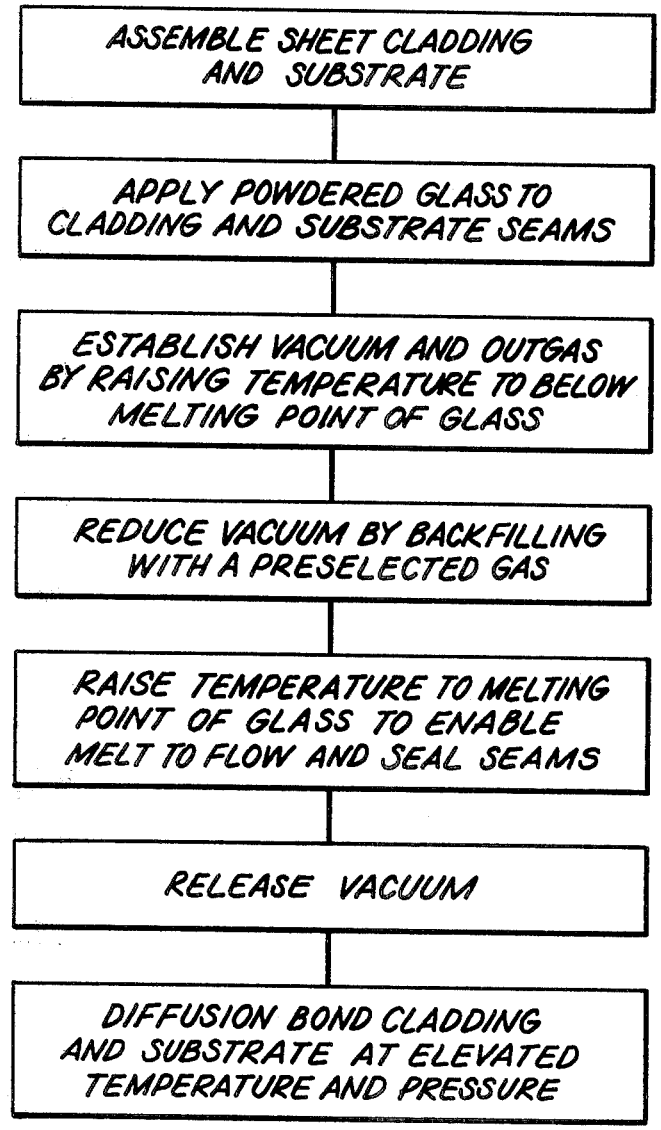

METHOD FOR DIFFUSION BONDING SHEET CLADDINGS TO SUPERALLOY SUBSTRATES

BACKGROUND OF THE INVENTION

The surface stability of superalloys is a significant problem for advanced industrial gas turbines. Highly corrosive environments are generated by the combustion of heavy fuel oils and when coupled with higher firing temperatures and longer maintenance intervals, very strict limitations arise in material selection. The application of an oxidation and hot corrosion resistant sheet cladding alloy to a high strength substrate represents one solution to the surface stability problem.

During the past several years, considerable progress has been made in the development of methods for the diffusion bonding of claddings to the substrates. For example, Schilling et al in U.S. Pat. No. 3,928,901 teach a method in which the sheet cladding is cold isostatically pressed to form a tight skin over the substrate. Beltran et al in U.S. Pat. No. 3,904,101 also teach a process of cladding in which the space between the cladding and the substrate is evacuated, all seams are vacuum brazed, and thereafter the assembly is diffusion bonded in an autoclave using a gaseous medium and elevated temperature and pressure. Schilling et al, U.S. Pat. No. 3,952,939, teach a process in which a preassembled sheet cladding and substrate is masked at all seams, surrounded with glass chips and then hot diffusion bonded while melting the glass and ensure an isostatic stress state. In application Ser. No. 785,303, filed Apr. 6, 1977 now abandoned and of common assignee as the instant application, Schilling et al disclosed a method in which the seams of the cladding are masked, a vacuum to outgas the part and the glass is drawn, and after reestablishing atmospheric pressure by backfilling the vacuum apparatus with nitrogen or argon, hot isostatic pressure is applied using molten glass as a sealant to ensure a pressure differential across the clad/substrate interface.

The cladding processes currently employed involve a relatively large number of steps, some of which are highly labor intensive and are therefore costly. These techniques are also difficult to apply to the more complex substrate configurations such as multivane nozzle segments.

It is the object of this invention to provide a new method for diffusion bonding sheet claddings to complex part configurations which eliminates several of major steps employed in the prior art while simultaneously offering the capacity for cladding difficult substrate configurations. This and other objects of the invention will become apparent to those skilled in the art from the following detailed description taken in connection with the FIGURE which illustrates sequential steps in practicing the present invention.

SUMMARY OF THE INVENTION

This invention relates to a method for diffusion bonding sheet claddings the substrates. More particularly, the method involves the application of powdered glass to the seams of the pre-formed cladding, melting the glass under a partial vacuum and in the presence of a preselected gas, and thereafter diffusion bonding the sheet cladding to the substrate. The process of the present invention eliminates the need for encasing the clad parts in a container filled with glass cull, eliminates the need for leak checking and outgasing of the containers, increases the number of parts which can be processed in each hot isostatic pressing cycle, reduces the amount of effort required after diffusion bonding for glass removal and part cleanup while maintaining the high quality of bonding achieved by the prior art processes.

DESCRIPTION OF THE INVENTION

The process of the present invention as illustrated in the FIGURE is applicable to the manufacture of gas turbine buckets, multivaned nozzle segments where configurations are difficult to fabricate, certain stages of ultra-high temperature turbine hot gas path parts, and the like. The preferred cladding materials are nickel-chromium alloys preferably in sheet form, such as those commercially available from the International Nickel Company under the designations IN-671 and IN-617. These nickel-chromium alloys are essentially 50-80% by weight of nickel and 20-50% by weight of chromium, with a preferred composition being Ni-50Cr. The more complex alloys contain a number of elements and are typified by IN-617 which contains 22 weight percent chromium, 1 weight percent aluminum, 2.4 weight percent cobalt, 9 weight percent molybdenum, 0.003 percent boron, 0.07 carbon with the balance being nickel. Other cladding material which can be used include Hastelloy X, FeCrAlY (2541), HS 188, 304 stainless steel, and the like.

In the first step of the method of this invention, the sheet cladding and substrate are assembled in the conventional fashion, that is, a cladding preform of the appropriate composition and shape and the substrate surfaces are prepared by appropriate means such as chemical etching, degreasing, abrading or nickel plating. The preform is then placed over the substrate and the seams are spot-welded or resistance seam welded in such a manner as to provide as small a gap between the cladding and substrate as is feasible. Generally, a gap of less than 1 mil can be achieved.

In the next step of the process, powdered glass is applied to the various cladding/substrate seams. Soda-lime, pyrex, vycor, borosilicate glasses and mixtures of these glasses can be used as well as mixtures with a metal or ceramic powder. The glass powder is preferably of a size such that it will pass through a #270 mesh screen and most preferably, through a #325 mesh screen. Conveniently, the powdered glass can be applied in the form of a slurry of the powder and a binding agent and allowed to dry. Alternatively, a glass powder transfer tape can be used.

The glass coated, clad substrate assembly is then placed in a suitable vessel which is capable of maintaining vacuum, elevated temperature and controlled atmospheric conditions. Before melting the glass, it is preferred to eliminate any trapped air in the assembly, and when the glass has been applied in the form of a slurry, to eliminate the binder material. To accomplish this, a vacuum suitable to outgas the part is established. Generally, vacuums of about 5 μm Hg or less are suitable. The temperature is then raised to a point below the melting temperature of the powdered glass to remove the binder material. Generally, temperatures of about 600°–800° F. (about 315°–430° C.) are suitable.

The level of vacuum is then reduced to a point at which the glass can be melted without decomposition. This step is necessary since most glasses are unstable under vacuum when molten. Since the melting step is affected in the presence of a preselected gas, it is most convenient to reduce the vacuum by backfilling the vessel with the preselected gas. The level of vacuum which will be employed is, of course, dependent upon the decomposition characteristics of the particular glass or mixture being utilized at the temperature which will be used to melt the glass. In general, the vacuum will not exceed about 0.25 atmosphere and is preferably about one-half atmosphere.

In the next step of the process, the glass covering the seams of the assembly is melted by raising the temperature to a point where the powder melts and flows in the presence of a preselected gas. The temperature employed depends on the melting point of the glass which is used. Once the glass melts, the space between the cladding and substrate containing a small amount of residual gas is sealed from the outside environment.

The preselected gas is a composition which is selected so as to produce minimal bondline interface contamination. Thus, any gas which will dissolve in the cladding or the substrate matrix at the glass melting temperature or the temperatures utilized in the subsequent diffusion bonding step so as to be inert in the article are applicable. This concept of dissolving includes reaction with the alloying element of the cladding or substrate to form an inactive product. By inactive is meant that the gas or reaction product will not destroy or substantially weaken the metallurgical bond formed or substantially interfere with the formation of those bonds. For these reasons, inert gases such as helium or argon are not usable since they are unreactive and would remain at the interfaces. Nitrogen has been found to be a particularly suitable gas but other gases such as oxygen or hydrogen or mixtures of such gases can be used in the appropriate circumstances.

After the glass has melted and sealed the seams, the pressure can be released and the assembly removed from the vacuum device. The assembly is then subjected to diffusion bonding at elevated temperature and pressure in the conventional fashion. During this diffusion bonding, a further deformation and movement of the cladding into intimate contact with the substrate occurs. The molten glass is viscous during this movement and can easily accommodate the movement while maintaining the required pressure differential across the cladding-substrate interface. After the hot isostatic press bonding is complete, the relatively small amount of remaining glass can be easily removed by such means as sand-blasting and the like. It will be appreciated that since the glass has been used only where necessary, the problems of glass removal from hollow parts and dovetail regions encountered when using prior art processes are obviated.

In order to further illustrate the present invention, an example of the formation of a clad tubine bucket is described below. It will be appreciated that throughout this specification and claims, all parts and percentages are given by weight and all temperatures are in degrees Celsius unless otherwise specified.

An IN-738 turbine bucket was obtained in the "as cast" condition, cleaned and given a 0.5 mil nickel strike. Following the plating, the bucket was vacuum diffusion heat treated at 2050° F. (about 920° C.) for one hour to outgas the nickel plate and interdiffuse it with the IN-738 substrate. An IN-671 (Ni-50 Cr) preform was made by the cold isostatic pressure forming process described in U.S. Pat. No. 3,928,901 using the plated bucket as the forming mandrel.

The bucket and the preform were vapor degreased in trichloroethylene and fitted together. The assembly was then repressed in a die press to ensure as close an initial cladding-airfoil fit as possible. The cladding was spot-welded to the bucket using a low power (about 60 watt-second) spot welder, taking care to ensure as tight a cladding-airfoil seam fit as possible.

A slurry was prepared by mixing about 200 grams of −325 mesh (44 um) soda-lime glass powder with about 30 cc of "Nicrobraze"cement (a binder which is about 80% ethyl methacrylate and 20% methyl methacrylate). The slurry was then applied to the top and bottom cladding-bucket seams as well as the cladding-lap joint on the convex side of the airfoil and allowed to air dry. During this period, the solvent cleanly evaporated leaving the binder to hold the glass particles together on the bucket.

After drying, the assembly was placed in a retort which was fitted with evacuation and backfill ports, a thermocouple vacuum gage and a thermocouple feedthrough. A thermocouple was placed in the airfoil hollow to monitor bucket temperature. The retort was then evacuated to about 5 μm Hg vacuum and placed in a hot crucible type furnace which was idling at about 1800° F. (982° C.). When the bucket temperature reached about 700° F. (371° C.), the retort was backfilled to one-half atmosphere with pure nitrogen and the temperature was raised to 1600° F. (871° C.). At this point, the binder was outgassed and the glass powder melted.

After 15 minutes, the retort was backfilled to one atmosphere with nitrogen, opened, the part removed hot and placed directly in an autoclave furnace which was at 1800° F. (982° C.). The glass which had been placed at the seams had melted and had isolated the interface. The autoclave was sealed and pressurization begun. The part was hot isostatically pressed at maximum parameters of 2100° F. (1149° C.) and 15 KSI. After completion of the autoclave cycle, the part was removed, allowed to air cool to room temperature and the bucket was then cleaned by glass bead blasting.

Visual inspection indicated complete bonding over the entire airfoil surface. A transverse section of the airfoil was metallographically prepared and little difference in bond line structure was observed when the specimen was compared to one which had been given the conventional glass hot isostatic pressing cycle. A uniform diffusion zone of about 1 mil was observed around the entire bucket circumference indicating a true diffusion bond had been achieved. The scarf/lab joint on the convex (suction) surface of the bucket was fully bonded both to the bucket and to itself.

Various changes and modifications can be made in the method of this invention without departing from the spirit and scope thereof. The various embodiments which have been described herein were for the purpose of further illustrating the invention but were not intended to limit it.

We claim:

1. A method of applying a sheet cladding to a substrate comprising (a) assembling the sheet cladding to the substrate so that the cladding closely conforms to the substrate; (b) applying powdered glass to the seams of the cladding and the substrate; (c) establishing a vacuum at which the glass can be melted without decomposition; (d) melting the glass under said vacuum in the presence of a gas which is dissolvable in the cladding or substrate to enable at least a portion of the melted glass to seal the seams between the cladding and the substrate; and (e) diffusion bonding the sheet cladding and substrate at elevated temperature and pressure.

2. The method of claim 1 wherein said gas is nitrogen.

3. The method of claim 2 wherein after step (b) and before step (c), a vacuum sufficient to outgas the assembly is established.

4. The method of claim 3 wherein said powdered glass is applied in the form of a slurry containing a binder.

5. The method of claim 4 wherein said binder is expelled before or when said glass is melted.

6. The method of claim 5 wherein said vacuum established in step (c) is not greater than 0.25 atmosphere.

7. The method of claim 6 wherein said vacuum is about 0.5 atmosphere.

* * * * *